US005737844A

United States Patent [19]

Brumley

[11] Patent Number: 5,737,844

[45] Date of Patent: Apr. 14, 1998

[54] TRIM GAUGE

[76] Inventor: Philip T. Brumley, 25730 Van Dyke, Centerline, Mich. 48015

[21] Appl. No.: 633,919

[22] Filed: Apr. 15, 1996

[51] Int. Cl.$^{6}$ .............................. G01B 5/14; B43L 13/02; E04F 21/00

[52] U.S. Cl. .................................... 33/194; 33/42; 33/464

[58] Field of Search ................................ 33/194, 42, 464, 33/480, 43, 44, 646, 647, 648, 649

[56] References Cited

U.S. PATENT DOCUMENTS

| | | | |
|---|---|---|---|
| 445,646 | 2/1891 | Welsh | 33/44 |
| 1,598,993 | 9/1926 | Vlazny | 33/42 |
| 1,792,393 | 2/1931 | Phillips | 33/42 |
| 2,144,697 | 1/1939 | Zangrando | 33/42 |
| 2,675,617 | 4/1954 | Goldman et al. | 33/42 |
| 2,729,895 | 1/1956 | Backstrom | 33/42 |
| 4,930,221 | 6/1990 | Taylor | 33/42 |

OTHER PUBLICATIONS

Leichung Workshops Catalog, Winter, 1996, p. 80.
Leichtung Workshops catalog, Winter, 1996, p. 2.

*Primary Examiner*—Christopher W. Fulton
*Attorney, Agent, or Firm*—Dykema Gossett PLLC

[57] ABSTRACT

A trim gauge for aiding in the installation and trimming of building windows and doors includes an elongated first member and an elongated second member. Both the first member and the second member each have first and second ends, and are equal in length to each other. The first member and second member are parallel and are fixed to each other in a longitudinally offset position to define a longitudinal gauge length and are laterally offset to define a lateral gauge width.

2 Claims, 2 Drawing Sheets

FIG 1
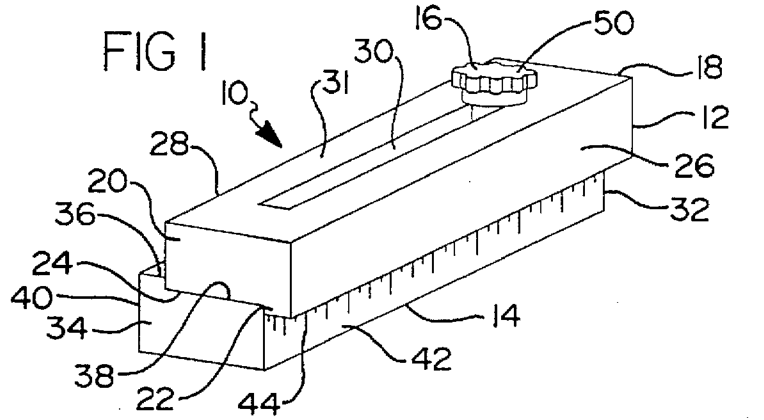
FIG 2
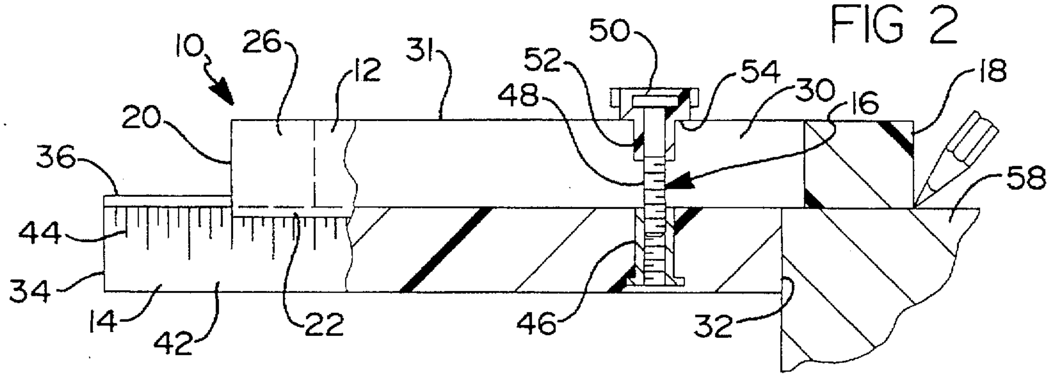
FIG 6
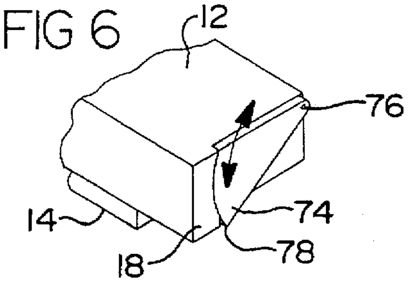
FIG 5
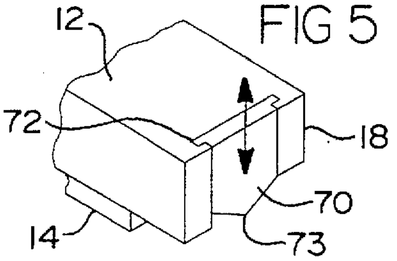
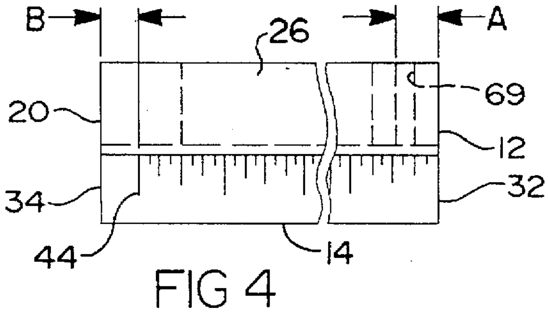
FIG 4
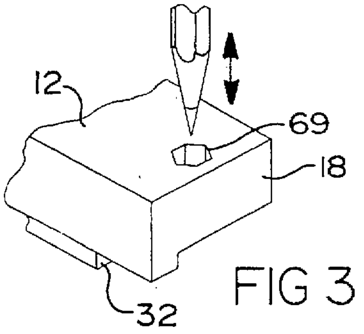
FIG 3

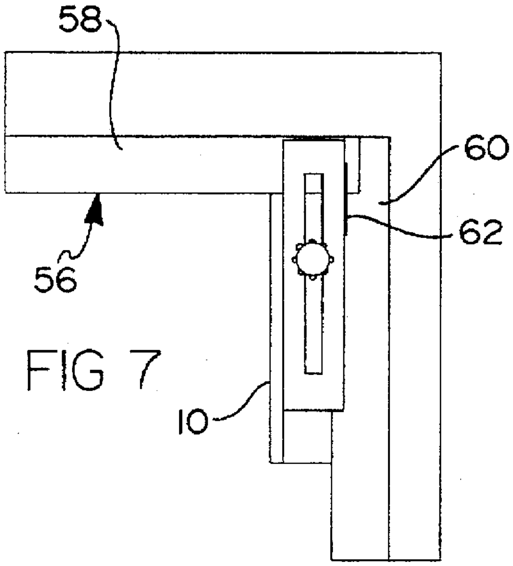
FIG 7
FIG 8
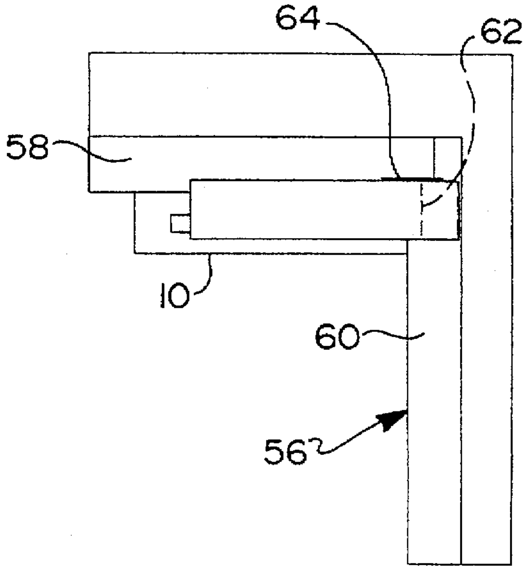
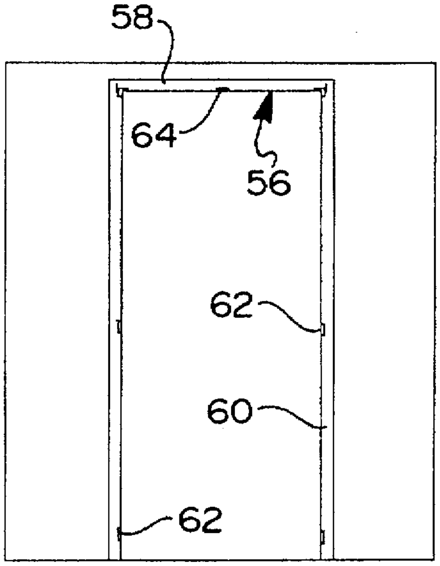
FIG 9
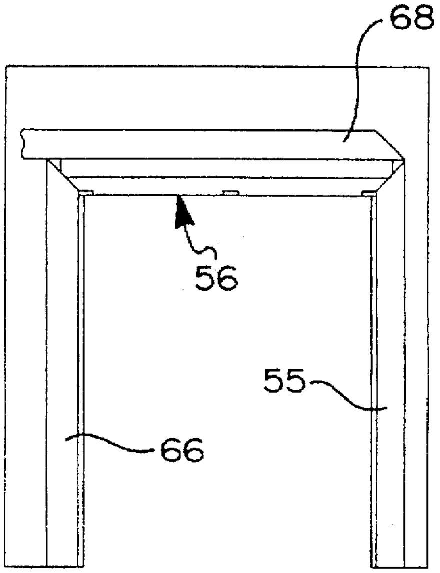
FIG 10

TRIM GAUGE

FIELD OF THE INVENTION

The present invention relates to the field of gauges used for the sizing and fitting of trim, such as the wooden moldings around doors and windows.

BACKGROUND OF THE INVENTION

Known gauges or squares used in carpentry tend to be rather large, and unwieldy to use. One popular type employs a steel scale or ruler upon which is slidably mounted a right angle portion. The right angle portion can be set at a predetermined distance from an end of the steel scale and butted up against a door or window frame to make marks at the predetermined distance from the edge of the frame. The gauges described are particularly unwieldy for measuring relatively short distances because much of the steel scale extends beyond the right angle making the gauge difficult to stabilize as is required to provide consistent markings for location of trim pieces, for the installation of windows and doors.

It is therefore desired to provide a light weight hand held gauge well suited for making locating marks to aid in the sizing and fitting of trim.

SUMMARY OF THE INVENTION

A trim gauge for aiding in the installation and trimming of building windows and doors includes an elongated first member and an elongated second member. Both the first member and the second member each have first and second ends, and are equal in length to each other. The first member and second member are parallel and are fixed to each other in a longitudinally offset position to define a longitudinal gauge length and are laterally offset to define a lateral gauge width.

The trim gauge is relatively small and easily held in the hand, making it ideally suited for use in making marks for locating, fitting, and sizing trim pieces of various types.

BRIEF DESCRIPTION OF THE DRAWINGS

FIG. 1 is a perspective view of a trim gauge with both the first member and the second member longitudinally aligned.

FIG. 2 is a sectional side view of the trim gauge longitudinally offset by one-half inch and abutting a frame member.

FIG. 3 is a perspective view of an end portion of a second embodiment of the invention.

FIG. 4 is a side view of the embodiment shown in FIG. 3.

FIG. 5 is a perspective view of an end portion of a third embodiment of the invention.

FIG. 6 is a perspective view of an end portion of a fourth embodiment of the invention.

FIG. 7 is a front view of a portion of a door frame with the trim gauge in a first position for marking the door jamb.

FIG. 8 is a front view of a portion of a door frame with the trim gauge in a second position for marking the header.

FIG. 9 is a door opening showing all of the trim-locating marks on the door frame.

FIG. 10 is a door frame with a top piece of trim being sized for cutting.

DESCRIPTION OF A PREFERRED EMBODIMENT

A trim gauge 10 as shown in FIGS. 1 and 2 includes an elongated first member 12 and an elongated second member 14 equal in length to a first member 12. Lock mechanism 16 maintains first member and second member in a selected axial orientation.

First member 12 has a first end 18 and an oppositely disposed second end 20.

A first retaining lip 22, 3/16 of an inch wide, projects downwardly from first engagement surface 24 on a first side 26 of first member 12. First member 12 in a first preferred embodiment is four inches long by 7/8 inches wide by 7/16 inches thick. First retaining lip 22 extends approximately 1/16 of an inch beyond engagement surface 24. A first graduated measuring scale (not shown) is molded into second side 28. The first scale is incremented in fractions of an inch, with the smallest increment being 1/16 of an inch. Alternatively, other increments, such as millimeters could be employed. First member 12 has an elongated slot 30 measuring approximately three inches by 0.25 inches extending upward from first engagement surface 24 to top surface 31. First side 26 remains plain and is well suited for receiving identifying labels or promotional logos thereon.

Second member 14 has a first end 32 and an oppositely disposed second end 34. A second retaining lip 36, also 3/16 of an inch wide, projects upward from a second engagement surface 38. The other dimensions of the second member are also essentially equal to those of the first member. Second retaining lip 36 defines a portion of first side 40 of second member 14. First side 40 remains plain to receive a label or promotional marking. A second graduated measuring scale 44 is molded into second side 42 opposite first side 40. Scale 44 is incremented in fractions of an inch. Alternatively, scale 44 could be in millimeters. The first and second scales can either be both in English or metric units, or mixed with one in English and one in metric to provide a user with the alternative of measuring in millimeters or inches with the same trim gauge 10.

With first and second members, 12 and 14 respectively, in an assembled position, their engagement surfaces 24 and 38 slidably contact one another. The lips 22 and 36 each overlap the graduated scale on the second sides of the opposite members. The overlap makes reading the scales particularly easy, and greatly facilitates fixing the parts to a predetermined longitudinal offset.

Lock mechanism 16 includes a threaded bushing 46 disposed in second member 14, as well as a threaded stud 48 having a plastic knob 50 molded thereover with circumferentially distributed teeth to assist gripping of knob 50. Threaded metal bushing 46 is located 0.75 inches from first end 32 and 0.25 inches from second side 42. Knob 50 includes a sleeve portion approximately 0.25 inches in diameter for disposition within slot 30 and a shoulder 54 engaging top surface 31. Shoulder 54 is approximately 0.5 inches in diameter, providing sufficient engagement area between shoulder and top surface 31 to clamp first member 12 to second member 14 without damaging either knob 50 or top surface 31.

Trim gauge 10 is used to locate trim 55 around a door frame 56 in the following mariner. Knob 50 is turned counterclockwise to loosen lock mechanism 16, enabling first member 12 and second member 14 to slide relative to one another. Since sleeve portion 52 has a diameter approximately equal to the width of slot 30, knob 50 stays centered within slot 30 after being loosened. Retaining lips 22 and 36 each have inner sides in slidable engagement with second sides 28 and 42 to prevent relative rotation between first and second members 12 and 14. First member 12 and second member 14 are longitudinally positioned to a desired longitudinal gauge length, such as 3/4 inches as shown in FIG. 2, by aligning second end 20 with the 3/4 inch mark of scale 44. Since first member 12 and second member 14 are the same length, first end 32 of second member 14 is automatically aligned with the first scale at the ¾ inch mark, resultantly creating identical gauge lengths at both ends.

Second end 20 is abutted against a header 58 as shown in FIGS. 2 and 7, and second side 42 against a door jamb 60. A pencil, or some other scribing instrument, is used to draw a vertical line 62 along side 26 on door jamb 60, and extending across header 58. Line 62 is spaced 3/16 of an inch, the width of lip 22, the lateral gauge width and the standard reveal for home construction molding, from an edge of door jamb 60.

Trim gauge 10 is then flipped over as shown in FIG. 8, and butted up against both header 58 and door jamb 60. A horizontal line 64 is drawn along side 40, 3/16 of an inch from the edge of header 58, intersecting line 60. This procedure is repeated at the left hand corner. Lines are marked along the lengths of both door jambs 60 and header 58 as shown in FIG. 9. Trim piece 55 is positioned along line 61 on the right hand door jamb 60 and marked along an inside edge at the intersection of lines 62 and 64. Trim piece 55 is then cut at a 45 degree angle through the mark as shown by a miter line 64. A second piece of vertical trim 66 is similarly sized and cut for a left hand door jamb as shown in FIG. 10. A third or top piece of trim 68 (not shown) is first mitered, and then laid across the two vertical pieces of trim, aligning the outside mitered corner of trim piece 55 and trim piece 68, and marking top trim piece 68 where it touches trim piece 66. The top piece 68 is then cut at a 45 degree angle on each end to nest between the two vertical pieces of trim, thereby providing mitered joints between the top piece 68 and the two vertical pieces 55 and 66.

To mark the door frame at spacing other than 3/16 of an inch from an edge, knob 50 is loosened and the first member 12 and the second member 14 longitudinally positioned to a desired longitudinal gauge length. A pencil can be used to scribe a mark the desired distance from the edge as shown in FIG. 2.

Alternative embodiments shown in FIGS. 3–6 show alternative scribing means. The embodiment of FIGS. 3 and 4 is used to locate a pencil tip within gauge 10. A hexagonal aperture 69 sized to receive a standard pencil is formed in a first end of first member 12. A center of aperture 69 is located a distance A from first end 12. Scale 44 is spaced a distance B from second end 34 of second member 14, with distance B equaling distance A. When second end 20 of first member 12 is aligned with the first marking of scale 44, the pencil is at the zero inch mark. Similarly, when surface 20 is aligned with the one inch mark, the center of the pencil aperture 69 and the pencil is spaced one inch from surface 32. Aperture 69 can, of course, be circular instead of hexagonal.

A second alternative embodiment is shown in FIG. 5. A vertically displaceable scriber 72 is slidably disposed within a T-shaped slot in the first end 18 of first member 12. There is a slight interference fit between T-shaped slot 72 and vertically displaceable scriber 70 to prevent scriber 70 from either dropping out of slot 72 altogether, or from dropping into a scribe position accidentally. Vertically displaceable scriber 70 is operated in the following manner. First member 12 and second member 14 are offset to a desired gauge length as described in the description of the first embodiment. The person using trim gauge 10 presses downward on scriber 70 with their thumb or finger, forcing a sharpened point 73 into the surface being marked. Scriber 70 is returned to a non-marking position by pressing point 73 against a suitable piece of scrap material or the like. Alternatively, scriber 70 can be provided with a loose fit in slot 72, and biased upward by a spring force.

FIG. 6 shows a third alternative embodiment of the invention employing a pivoting scriber 74. Pivoting scriber 74 is rotated about pivot pin 76 by pressing on an upper surface of scriber 74 with a thumb or finger, forcing a scribing point 78 into the object being marked. A light interference is provided between scriber 74 and first end 18 to prevent scriber 74 from accidentally dropping to a scribed position. Scriber 76 can be returned to a non-marking position by pressing tip 78 against a block of scrap material. Alternatively, scriber 74 can have a loose fit with respect to first end 18 and be biased upward by a spring.

Preferred embodiments have been disclosed. A worker of ordinary skill in the art would realize, however, that certain modifications would come within the teaching of this invention. For example, one could make the gauge to different dimensions (longer, shorter, wider, narrower, thicker, thinner) than that described here. Additionally, the anti-rotation features comprising the retaining lips can be configured differently, and yet still provide the same function. For example, an alternative embodiment could be designed with one of the first member and the second member being substantially wider than the other and including both retaining lips. Further, the lateral gauge dimension of 3/16 of an inch can be varied by changing the thickness of lips 22 and 36. The following claims should be studied in order to determine the true scope and content of the invention.

I claim:

1. A trim gauge for aiding in the installation and trimming of building windows and doors comprising:

an elongated first member having a first end and a second end and a first engagement surface disposed therebetween;

an elongated second member having a first end and a second end and a second engagement surface disposed therebetween in engagement with the first engagement surface and the second member being equal in length to the first member and being in parallel with the first member and longitudinally adjustable relative thereto and having a side surface engaged by an overlapping side surface of the first member wherein the overlapping side surfaces prevent relative rotation and the first and second members are laterally offset an equal amount with respect to each other; and a selectively actuable locking mechanism disposed between the first member and the second member, wherein the first and second members each have a side lip projecting from their respective engagement surfaces to define both side surfaces and equal lateral gauges on both sides.

2. A trim gauge for aiding in the installation and trimming of building windows and doors comprising:

an elongated first member having a first end and a second end and a first engagement surface disposed therebetween and a side lip projecting from the engagement surface;

an elongated second member having a first end and a second end and a second engagement surface disposed therebetween in engagement with the first engagement surface and the second member being equal in width and length to the first member and having a second side lip projecting from the second engagement surface in parallel with the first side lip and equal in width to the first side lip wherein the side lips define equal lateral gauges on opposite sides of the trim gauge; and a selectively actuable locking mechanism disposed between the first member and the second member wherein the trim gauge can be selectively fixed at a desired longitudinal offset of the elongated members.

* * * * *